United States Patent [19]

Back et al.

[11] Patent Number: 4,617,382

[45] Date of Patent: Oct. 14, 1986

[54] 8-HYDROXYQUINOLINE SULFONIC ACID-AZO CHROMIUM COMPLEXES

[75] Inventors: Gerhard Back, Lörrach, Fed. Rep. of Germany; Fabio Beffa, Riehen; Arthur Bühler, Rheinfelden, both of Switzerland

[73] Assignee: Ciba-Geigy Corporation, Ardsley, N.Y.

[21] Appl. No.: 484,736

[22] Filed: Apr. 13, 1983

Related U.S. Application Data

[63] Continuation of Ser. No. 325,455, Nov. 27, 1981, abandoned, which is a continuation of Ser. No. 858,996, Dec. 9, 1977, abandoned, which is a continuation of Ser. No. 804,845, Jun. 8, 1977, abandoned, which is a continuation of Ser. No. 584,807, Jun. 9, 1975, abandoned.

[30] Foreign Application Priority Data

Jul. 5, 1974 [CH] Switzerland .............. 9307/74

[51] Int. Cl.$^4$ .............. C09B 45/06; C09B 45/16; C09B 55/00; D06P 3/02
[52] U.S. Cl. .................. 534/693; 534/602; 534/695; 534/700; 534/706; 534/710; 534/713; 534/721; 534/739; 534/771; 534/772; 534/792; 534/839; 534/859; 534/872; 534/876; 534/877; 556/57; 564/274
[58] Field of Search .............. 260/146 R, 147, 148, 260/149, 150, 151; 534/693, 695, 700, 706, 710, 713, 721, 737; 556/57

[56] References Cited

U.S. PATENT DOCUMENTS 3,125,561  3/1964  Beffa et al. .............. 260/146 R
3,728,328  4/1973  Liehard et al. ............ 260/147
4,123,429 10/1978  Brauard et al. ............ 534/693

FOREIGN PATENT DOCUMENTS 809185  6/1974  Belgium .............. 634/693
812151  4/1959  United Kingdom ............ 260/151
964800  7/1964  United Kingdom ............ 260/146 R

OTHER PUBLICATIONS

Jonassen et al, J. Amer. Chem. Soc., vol. 80, pp. 2347 to 2350 (1958).

Primary Examiner—Floyd D. Higel

Attorney, Agent, or Firm—Edward McC. Roberts; Meredith C. Findlay

[57] ABSTRACT

The present invention relates to novel chromium complex dyes of the formula

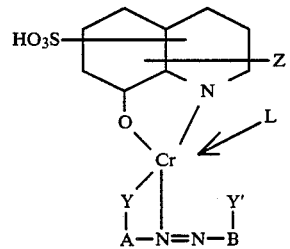

wherein
Z is hydrogen, chloro, bromo, nitro, lower alkyl or acylamino;
L is H$_2$O, ammonia, ethanol or ethanolamine;
Y is —O— or —COO—;
Y' is —O—, —NH—, —N(lower alkyl)— or —N(phenyl)—;
A is ortho-phenylene or ortho-naphthalene which are unsubstituted or substituted by chloro, bromo, cyano, nitro, lower alkyl, lower alkoxy, phenoxy, sulfonamido, substituted sulfonamido, substituted sulfonyl or acylamino; and
B is ortho-naphthalene which is unsubstituted or substituted by chloro, acyl, acylamino, lower alkyl, lower alkoxy, sulfonamido, substituted sulfonamido or substituted sulfonyl;

where "acyl" is lower alkanoyl, lower alkoxycarbonyl, loweralkylsulfonyl, benzoyl, chlorobenzoyl, methylbenzoyl, nitrobenzoyl, phenoxycarbonyl, phenylsulfonyl or p-methylsulfonyl; substituted sulfonamido and those substituted by lower alkyl, lower hydroxyalkyl, lower alkoxyalkyl, lower cyanoalkyl, cyclohexyl or benzyl; and substituted sulfonyl is lower alkylsulfonyl, lower alkylsulfonyl substituted by hydroxy, chloro or lower alkoxy, chlorophenylsulfonyl, methylphenylsulfonyl, nitrophenylsulfonyl, methoxyphenylsulfonyl, or benzylsulfonyl.

These dyes are useful in dyeing and printing materials such as silk, leather, wool and synthetic polyamides with good exhaustion and yielding level dyeings of good fastness properties.

2 Claims, No Drawings

8-HYDROXYQUINOLINE SULFONIC ACID-AZO CHROMIUM COMPLEXES

This application is a continuation of application Ser. No. 325,455, filed on Nov. 27, 1981, now abandoned, which is a continuation of application Ser. No. 858,996, filed on Dec. 9, 1977, now abandoned, which is a continuation of application Ser. No. 804,845, filed June 8, 1977, now abandoned, which in turn is a continuation of application Ser. No. 584,807, filed June 9, 1975, now abandoned.

The present invention provides chromium complex dyes which contain one atom of chromium bonded to two complexing agents one of which is a 8-hydroxyquinolinesulphonic acid and the other a o,o'-dihydroxy, o-hydroxy-o'-amino, o-carboxy-o'-hydroxy- or o-carboxy-o'-aminomonoazo dye which contains no sulpho groups and is not in ortho-position to the azo or azomethine group or is a o,o'-dihydroxy- or o-carboxy-o'-hydroxyazomethine dye.

These dyes preferably have the formula

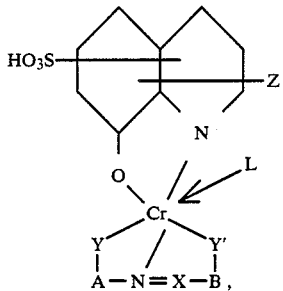

(1)

wherein Z represents hydrogen, chlorine, bromine, nitro, acylamino or low molecular alkyl, Y represents an oxygen atom, the —COO group, Y' represents an oxygen atom, the —NH group or a N-alkyl, N-aryl or N aralkyl group, X represents a nitrogen atom or the CH group, A represents an unsubstituted or a substituted phenyl or naphthyl radical which is bonded in ortho-position to Y to the azo or azomethine group, an B represents the radical of a coupling component of the benzene, naphthalene, pyrazolone, pyridone or acetoacetamide class which couples in ortho-position to Y', or if X is CH group, is the radical of an unsubstituted or a substituted o-hydroxybenzaldehyde or o-hydroxynaphthaldehyde, and A and B do not contain sulpho or carboxy groups, and L is a ligand molecule which occupies the sixth coordination position of the chromium atom.

The ligand molecule L is a molecule with a single pair of electrons and usually originates from the solvent or chromium salt used during the manufacture. L is therefore primarily a H₂O molecule. But alcohols, ammonia and amines, e.g. ethanol, ethanolamine etc., are also possible. The ligands can be very easily exchanged.

If Y' is a substituted amino group, then it is above all a low molecular alkylamino group, such as the methylamino or ethylamino group, or is the pehnylamino group.

The novel dyes are manufactured by reacting a 8-hydroxyquinolinesulphonic acid, especially one of the formula

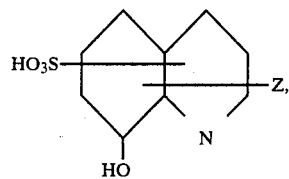

(2)

wherein Z represents hydrogen, chlorine, bromine, nitro, acylamino or alkyl, with the 1:1 chromium complex of a o,o'-dihydroxy-, o-hydroxy-o'-amino-, o-carboxy-o'-hydroxy- or o-carboxy-o'-amino-monoazo dye which does not contain sulpho groups and is not in ortho-position to the azo or azomethine group, or of a o,o'-dihydroxy- or o-carboxy-o'-hydroxyazomethine dye. In particular, a start is made from the 1:1 chromium complexes of dyes of the formula

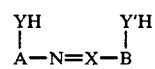

(3)

wherein Y represents an oxygen atom, the —COO group, Y' represents an oxygen atom, the —NH group or a N-alkyl, N-aryl or N-aralkyl group, X represents a nitrogen atom or the CH group, A is an unsubstituted or a substituted phenyl or naphthyl radical which is bonded in ortho-position to Y to the azo or azomethine group, and B is the radical of a coupling component of the benzene, naphthalene, pyrazolone, pyridone or acetoacetamide class which couples in ortho-position to Y', or, if X is the CH group, is the radical of an unsubstituted or a substituted o-hydroxybenzaldehyde or o-hydroxynaphthaldehyde, and A and B do not contain sulpho or carboxy groups.

Instead of the groups YH and Y'H which are capable of complex formation, the dyes of the formula (2) can carry substituents which are convertible into metallisable groups, e.g. low molecular alkoxy groups, especialy methoxy groups, provided these are split to a hydroxy group during the chroming.

The dyes of the formula (3) are obtained in known manner by coupling, and in the case of the azomethine compounds, by condensation.

In addition to carrying the complex forming group, the radical A can carry the usual non-ionogenic substituents occuring in dyes, e.g. chlorine, bromine, cyano, nitro, low molecular alkyl, low molecular alkoxy, aryloxy, above all phenoxy, sulphonamido and N-monosubstituted of N,N-disubstituted sulphonamido groups, sulphone groups and acylamino groups.

The term "acylamino" denotes herein amino groups which are substituted by acyl radicals of aliphatic or aromatic sulphonic and, in particular, carboxylic acids or of carbonic acid monoalkyl or monoaryl esters. The term "acyl" therefore encompasses low molecular alkanoyl, alkoxycarbonyl and alkylsulphonyl groups, such as the acetyl, chloroacetyl, propionyl, butyryl, methoxycarbonyl, ethoxycarbonyl, methylsulphonyl or ethylsulphonyl groups, as well as aroyl, aryloxycarbonyl and arylsulphonyl groups, e.g. the benzoyl, chlorobenzoyl, methylbenzoyl, nitrobenzoyl, phenoxycarbonyl, phenylsulphonyl or p-methylsulphonyl group. Preferred acylamino groups are low molecular alkanoylamino, alkoxycarbonylamino or unsubstituted or substituted benzoylamino groups.

As monosubstituted or disubstituted sulphonamide groups mention may be made principally of the sulphonamide groups which are substituted by low molecular alkyl, hydroxyalkyl, alkoxyalkyl, cyanoalkyl, aralkyl, cycloalkyl, in particular cyclohexyl, aralkyl, in particular benzyl, or sulphonamide groups which are substituted or by aryl radicals. Suitable sulphone groups are primarily low molecular alkylsulphonyl groups, low molecular alkylsulphonyl groups which are substituted by hydroxy, chlorine or low molecular alkoxy, chlorophenylsulphonyl, methylphenylsulphonyl, nitrophenylsulphonyl, methoxyphenylsulphonyl or benzylsulphonyl groups.

The term "low molecular" denotes herein radicals of 1 to 4 carbon atoms.

Suitable diazo components and aromatic amines from which the radical A is derived are: 2-amino-1-hydroxybenzene, 2-amino-1-methoxybenzene, anthranilic acid, 4- or 5-sulphonamidoanthranilic acid, 3- or 5-chloroanthranilic acid, 4-chloro- and 4,6-dichloro-2-amino-1-hydroxybenzene, 4- or 5- or 6-nitro-2-amino-1-hydroxybenzene, 4-chloro- and 4-methyl- and 4-acetylamino-6-nitro-2-amino-1-hydroxybenzene, 6-acetylamino- and 6-chloro-4-nitro-2-amino-1-hydroxybenzene, 4-cyano-2-amino-1-hydroxybenzene, 4-methoxy-2-amino-1-hydroxybenzene, 2-amino-1-hydroxybenzene-5-methyl- and 5-benzylsulphone, 2-amino-1-hydroxy-benzene-4-methylsulphone, 2-amino-1-hydroxybenzene-4-ethylsulphone, 2-amino-1-hydroxybenzene-4-chloromethylsulphone, 2-amino-1-hydroxybenzene-4-butylsulphone, 2-amino-1-hydroxybenzene-4- or -5-sulphamide, 2-amino-1-hydroxybenzene-4- or -5-sulph-N-methylamide, 2-amino-1-hydroxybenzene-4- or 5-sulph-N-β-hydroxyethylamide, 2-amino-1-methoxybenzene-4-sulphanilide, 4-methoxy-5-chloro-2-amino-1-hydroxybenzene, 4-methyl-2-amino-1-hydroxybenzene, 4-chloro-5-nitro-2-amino-1-hydroxybenzene, 4,5-dichloro-2-amino-1-hydroxybenzene, 5-nitro-4-methyl-2-amino-1-hydroxybenzene, 5-nitro-4-methoxy-2-amino-1-hydroxybenzene, 3,4,6-trichloro-2-amino-1-hydroxybenzene, 6-acetylamino-4-chloro-2-amino-1-hydroxybenzene, 4,6-dinotro-2-amino-1-hydroxybenzene, 4-nitro-2-amino-1-hydroxybenzene-5- or -6-sulphonic acid amide, 4- or 5-chloroanisidine, 4- or 5-nitroanisidine, 2-methoxy-5-methylaniline, 2,5-dimethoxyaniline, 2-anisidine-4- or -5-β-hydroxyethylsulphone.

The radical B can be derived in particular from the following groups of coupling components: naphthols which couple in ortho-position to the OH group and which are unsubstituted or substituted by chlorine, acylamino, acyl, low molecular alkyl, low molecular alkoxy, sulphonamido, N-mono-substituted or N,N-disubstituted sulphonamido groups and sulphone groups, these groups having the same meanings as previously assigned to them; naphthylamines which couple in ortho-position to the amino group and which are unsubstituted or substituted by halogen, especially bromine, low molecular alkyl, low molecular alkoxy, sulphonamido, monosubstituted or disubstituted sulphonamido or sulphone groups; 5-pyrazolones which have in 1-position a phenyl or naphthyl radical which is unsubstituted or substituted by chlorine, nitro, low molecular alkyl and alkoxy groups, sulphonamido, N-alkylated sulphonamido groups or sulphone groups; 2,6-dihydroxy-3-cyano- or -3-carbonamido-4-alkylpyridines and 6-hydroxy-2-pyridones which are substituted in 1-position by low molecular, unsubstituted or substituted alkyl, e.g. methyl, isopropyl, β-hydroxyethyl, β-aminoethyl, γ-isopropoxypropyl or by —NH$_2$ or a substituted amino group, e.g. dimethylamino or diethylamino, and which carry in 3-position a cyano or carbonamido group and in 4-position a low molecular alkyl group, especially methyl; acetoacetic anilides and benzoylacetic anilides which can be substituted in the anilide nucleus by low molecular alkyl, alkoxy, alkylsulphonyl groups, low molecular hydroxy, alkoxy or cyanoalkylsulphonyl groups, sulphonamido and N-alkylated sulphonamido groups and by halogen or which are unsubstituted: phenols which are substituted by low molecular acylamino groups and/or by alkyl groups which contain 1 to 5 carbon atoms and which couple in ortho-position.

Examples of such coupling components are:
2-naphthol,
1,3- or 1,5-dihydroxynaphthalene,
2-naphthol-6-sulphonamide,
2-naphthol-6-β-hydroxyethylsulphone,
1-acetylamino-7-naphthol,
1-propionylamino-7-naphthol,
1-carbomethoxyamino-7-naphthol,
1-carboethoxyamino-7-naphthol,
1-carbopropoxyamino-7-naphthol,
1-dimethylaminosulphonyl-amino-7-naphthol,
6-acetyl-2-naphthol,
4-acetyl-2-naphthol,
4-methoxy-1-naphthol,
4-acetal-1-naphthol,
1-naphthol-3-, -4- or -5-sulphonamide,
2-naphthol-3-, -4-, -5-, -6-, -7- or -8-sulphonamide,
5,8-dichloro-1-naphthol,
5-chloro-1-naphthol,
2-naphthylamine
2-naphthylamine-1-sulphonic acid
2-aminonaphthalene-5-, -6- or -7-sulphonamide
2-aminonaphthalene-6-sulphonic acid-N-methyl-, N-ethyl, -N-isopropyl-, -N-β-oxyethyl- or -N-methoxypropylamide
2-aminonaphthalene-6-sulphanilide
2-aminonaphthalene-6-sulphonic acid-N-methylanilide
1-aminonaphthalene-3-, -4- or -5-sulphonamide
1-aminonaphthalene-5-methyl- or ethylsulphone
5,8-dichloro-1-aminonaphthalene
2-phenylaminonaphthalene,
2-N-methylaminonaphthalene
2-N-ethylaminonaphthalene
2-phenylaminonaphthalene-5-, -6- or -7-sulphonamide
2-(3'-chlorophenylamino)-naphthalene-5-, -6- or -7-sulphonamide
6-methyl-2-aminonaphthalene
6-bromo-2-aminonaphthalene
6-methoxy-2-aminonaphthalene
1,3-dimethylpyrazolone
3-methyl-5-pyrazolone
1-phenyl-3-methyl-5-pyrazolone
1-phenyl-3-carbonamido-5-pyrazolone
1-(2'-, 3'- or 4'-methylphenyl)-3-methyl-5-pyrazolone
1-[3'- or 4'-(β-hydroxyethylsulphonyl)-phenyl]-3-methyl-5-pyrazolone
1-(2'-methoxyphenyl)-3-methyl-5-pyrazolone
1-(2'-, 3'- or 4'-chlorophenyl)-3-methyl-5-pyrazolone
1-(2'-, 3'- or 4'-nitrophenyl)-3-methyl-5-pyrazolone
1-(2',5'- or 3',4'-dichlorophenyl)-3-methyl-5-pyrazolone
1-(2'-, 3'- or 4'-sulphamoylphenyl)-3-methyl-5-pyrazolone
1-(2'-, 3'- or 4'-methylsulphonylphenyl)-3-methyl-5-pyrazolone
2,6-dihydroxy-3-cyano-4-methylpyridine 1-methyl-3-cyano-4-ethyl-6-hydroxypyridone-(2)
1-amino-3-cyano-4-methyl-6-hydroxypyridone-(2)
1-phenyl-3-carbonamido-4-methyl-6-hydroxypyridone-(2)
acetoacetic anilide,
acetoacetic-4-(β-hydroxyethylsulphonyl)-anilide,
acetoacetic-o-anisidide,
acetoacetic-o-toluidide,
acetoacetic-o-chloroanilide,
acetoacetic anilide-3- or -4-sulphonamide,
acetoacetic-3- or -4-aminoanilide,
acetoacetic-m-xylidide,
4-methylphenol,
3-dialkylaminophenol, especially 3-dimethylamino- and 3-diethylaminophenol,
4-t-butylphenol,
4-t-amylphenol,
2- or 3-acetylamino-4-methylphenol,
2-methoxycarbonylamino-4-methylphenol,
2-ethoxycarbonylamino-4-methylphenol
3,4-dimethylphenol and 2,4-dimethylphenol The azomethine dyes of the formula (3) are manufactured by condensing in known manner the aromatic amines cited hereinbefore from which the radical A is derived with o-hydroxybenzaldehydes or o-hydroxynaphthaldehydes.

Examples of suitable aldehydes are:
2-hydroxybenzaldehyde,
3- and 5-methyl-2-hydroxybenzaldehyde,
3,5- and 3,6-dimethyl-2-hydroxybenzaldehyde,
5-butyl-2-hydroxybenzaldehyde,
5-chloro- or 5-bromo-2-hydroxybenzaldehyde,
3- and 4-chloro-2-hydroxybenzaldehyde,
3,5-dichloro-2-hydroxybenzaldehyde,
3-chloro-5-methyl-2-2-hydroxybenzaldehyde,
3-methyl-5-chloro-2-hydroxybenzaldehyde,
3- and 4- and 5-nitro-2-hydroxybenzaldehyde,
3,5-dinitro- and 4-chloro-5-nitro-2-hydroxybenzaldehyde,
4-methoxy-2-hydroxybenzaldehyde,
1-hydroxy-2-naphthaldehyde and its in 4-position chlorinated derivative; and 2-hydroxy-1-naphthaldehyde.

The preferred chromium complexes according to the invention are those wherein X is a nitrogen atom and B is the radical of a coupling component of the naphthalene class.

As hydroxyquinolinesulphonic acids, mention is to be made principally of 8-hydroxyquinoline-5- or -7-sulphonic acid and 5-chloro-8-hydroxyquinoline-7-sulphonic acid.

Chromium complex dyes with a particularly interesting utility are those of the formula

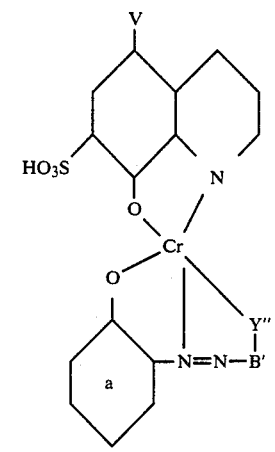

(4)

wherein L is a ligand molecule, especially water, V is hydrogen or chlorine, Y" is an oxygen atom or the NH or N-lower alkyl group and B' is an unsubstituted naphthyl radical or a naphthyl radical which is substituted by one or more of the following groups which can be the same or different: chlorine, acyl, acylamino, sulphonamido, N-monosubstituted or N,N-disubstituted sulphonamido, sulphone, low molecular alkyl and low molecular alkoxy groups, and wherein the phenyl radical a is unsubstituted or carries one or more of the following substituents which can be the same or different: chlorine, bromine, nitro, low molecular alkyl, low molecular alkoxy, sulphonamido, N-monosubstituted or N,N-disubstituted sulphonamido, sulphone and acylamino groups.

Particular importance attaches to those dyes of the formula (4) in which B' is derived from α-naphthol, β-naphthol or from 2-naphthylamine.

The conversation of the monoazo or azomethine dye of the formula (3) into the 1:1 chromium complex is effected by conventional methods which are known per se, e.g. by reacting it in an acid medium with a salt of trivalent chromium, e.g. chromium formiate, chromium sulphate, chromium chloride hexahydrate or chromium fluoride, at boiling temperature or optionally at temperatures which exceed 100° C. Trivalent chromium can also be manufactured in the reaction mixture from chromium-VI compounds, e.g. chromate, by simultaneously adding a reducing agent, e.g. butanol.

The reaction according to the invention of the 1:1 chromium complexes with the oxyquinoline compounds takes place in organic or aqueous or also organic/aqueous medium with neutral to alkaline reaction, in an open or closed vessel, at normal or elevated temperature, e.g. at temperatures between 50° and 120° C. It is usually advisable to react as far as possible equivalent amounts of the metal-containing 1:1 complex and the oxyquinolinesulphonic acids.

Instead of being obtained by prior manufacture of the 1:1 chromium complex compounds, the products obtained according to the present invention can also be manufactured by carrying out the chroming of the dyes of the formula (3) in the presence of oxyquinoline compounds.

The novel, chromium-containing monoazo dyes obtained according to the present process and its modification are suitable for dyeing and printing materials of the most widely varying kind, but above all for dyeing materials of animal origin, e.g. silk, leather and wool, especially however for dyeing and printing synthetic materials made from polyamide fibres, e.g. nylon 66. They are suitable for dyeing from a neutral to acid bath, e.g. from an acetic acid bath to which are added the assistants customarily used in the dyeing industry. The novel dyes exhaust well onto natural and synthetic polyamides and yield level dyeings of good fastness to light, washing, water, perspiration, fulling, decatising, carbonising alkali, acid, and rubbing. Their stability in the dyebath is also good.

Compared to similar dyes of the prior art, the novel compounds are characterised by good fastness to rubbing, light, and decatising as well as by a good levelling power.

The following Examples illustrate the invention, the parts and percentages being by weight unless otherwise stated.

EXAMPLE 1

33.9 parts of the monoazo dye of the formula

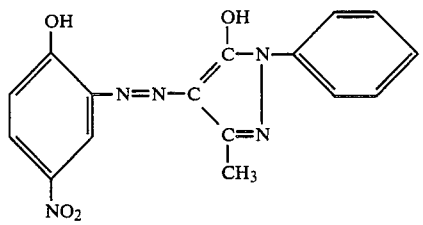

are stirred under reflux in 300 parts by volume of ethylene glycol monomethyl ether together with 26.6. parts of CrCl$_3$.6H$_2$O until the dye has been completely converted into the 1:1 chromium complex. The reaction mixture is cooled to about 90° C. and treated with a solution of 22.7 parts of 8-hydroxy-quinoline-7-sulphonic acid in 150 parts by volume of water and 40 parts by volume of a 10 normal sodium hydroxide solution, whereupon immediate reaction to give the mixed complex takes place. The clear, orange coloured solution is stirred for 1 hour at 90° to 95° C. and subsequently evaporated to dryness in vacuo. The dye which is obtained after grinding the residue is readily soluble in water and dyes wool or polyamide fibres from a weakly acid bath in full, orange shades which are fast to wet treatment and light.

EXAMPLE 2

29.85 parts of the monoazo dye of the formula

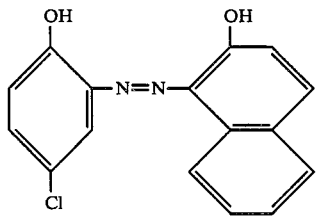

are added, with stirring, to 400 parts by volume of n-butanol. After addition of 26.6 parts of CrCl$_3$.6H$_2$O, the reaction mixture is heated to 115°–117° C., while separating the water of reaction as an azeotrope, until the starting dye is completely metallised to form the 1:1 chromium complex. The clear, reddish violet reaction solution is cooled to 90° to 95° C. and treated, with stirring, with a solution of 22.7 parts of 8-hydroxyquinoline-7-sulphonic acid in 150 parts of water and 40 parts by volume of a c. 25% ammonium hydroxide solution. The two-phase reaction mixture is heated until the internal temperature is approximately 115° C. while again seperating the water as an azeotrope. The batch is subssequently evaporated to dryness and the residue is ground. When applied from a dyebath which contains ammonium sulphate, the novel, water-soluble dye yields full, greyish violet shades which are fast to wet treatment and light on wool and polyamide fibres.

EXAMPLE 3

A mixture of 30.8 parts of the monoazo dye of the formula

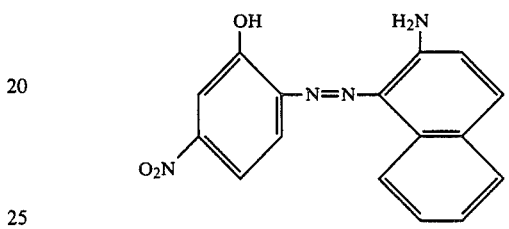

which is obtained in known manner, 300 parts by volume of ethylene glycol monomethyl ether and 26.6 parts of CrCl$_3$.H$_2$O is stirred under reflux at 115° C. until the starting dye has been completely converted into the bluish green 1:1 chromium complex. Subsequent reaction with 22.7 parts of 8-hydroxyquinoline-7-sulphonic acid in accordance with the particulars of Example 1 and evaporation of the reaction mixture to dryness yields a dye which is readily soluble in water and dyes wool or polyamide fibres from a bath which contains ammonium sulphate in full, green shades which are fast to wet treatment and light.

A green dye of identical coloristic behaviour is obtained by using n-butanol as solvent for the 1:1 chroming and otherwise proceeding in accordance with the particulars of Example 2.

EXAMPLE 4

36.5 parts of the monoazo dye obtained in known manner of the formula

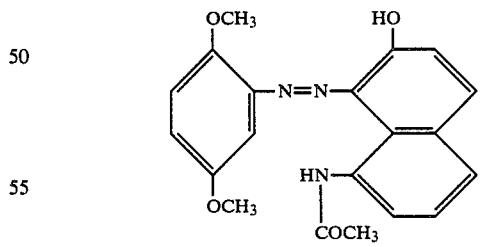

are added to 300 parts by volume of ethylene glycol monoethyl ether. After 26.6 parts of CrCl$_3$.6H$_2$O have been added, the reaction mixture is heated under reflux to 125° C. until the starting dye has been completely converted (demethylation of the methoxy group in ortho-position to the azo group) into the greenish blue 1:1 chromium complex of the corresponding o,o'-dihydroxyazo dye. Subsequent reaction with 22.7 parts of 8-hydroxyquinoline-7-sulphonic acid and isolation of the reaction product in accordance with the particulars of Example 1 yields a dye which dissolves in water with a bluish green shade and which gives dark green dyeings which are fast to wet treatment and light on wool and polyamide fibres.

EXAMPLE 5

35.65 parts of the monoazo dye obtained by known methods of the formula

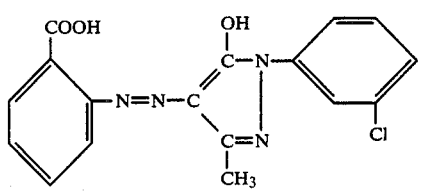

are stirred in 300 parts by volume of n-butanol and 26.6 parts of $CrCl_3.6H_2O$. The suspension is subsequently stirred in an autoclave at 130°–135° C. until the starting dye has been completely converted into the 1:1 chromium complex. After the reaction mixture has cooled to about 90° C. it is treated in accordance with the particulars of Example 2 with an aqueous solution in ammonia of 22.7 parts of 8-hydroxyquinoline-7-sulphonic acid and the reaction product is isolated by evaporating the batch in vacuo. The resultant dye which is readily soluble in water yields from a weakly acid bath full, reddish yellow dyeings of excellent fastness to light on wool or polyamide fibres.

The following Table lists in column I further monoazo dyes, which, when reacted in the form of the corresponding 1:1 chromium complexes with the compounds of column II, yield the shades listed in column III on wool or polyamide fibres.

|    | I | II | III |
|----|---|----|-----|
| 1  | 5-nitro-2-aminophenol → 2-aminonaphthalene | 8-hydroxyquinoline-5-sulphonic acid | green |
| 2  | 5-nitro-4-chloro-2-aminophenol → 2-aminonaphthalene | 8-hydroxyquinoline-7-sulphonic acid | bluish green |
| 3  | 4-nitro-2-aminophenol → 2-aminonaphthalene | 8-hydroxyquinoline-7-sulphonic acid | olive |
| 4  | 6-nitro-4-methyl-2-aminophenol → 2-aminonaphthalene | 8-hydroxyquinoline-7-sulphonic acid | dark green |
| 5  | 6-nitro-4-methyl-2-aminophenol → 1-phenol-3-methyl-5-pyrazolone | 8-hydroxyquinoline-7-sulphonic acid | red |
| 6  | 5-nitro-2-aminophenol → 1-phenyl-3-methyl-5-pyrazolone | 8-hydroxyquinoline-7-sulphonic acid | red |
| 7  | 4-chloro-2-aminophenol → 1-phenyl-3-methyl-5-pyrazolone | 8-hydroxyquinoline-7-sulphonic acid | scarlet |
| 8  | 5-nitro-2-aminophenol → 2,4-dihydroxyquinoline | 8-hydroxyquinoline-7-sulphonic acid | claret |
| 9  | 4-nitro-2-aminophenol → acetoacetic-2'-chloroanilide | 8-hydroxyquinoline-7-sulphonic acid | orange |
| 10 | 5-nitro-2-aminophenol → 2-hydroxynaphthalene | 8-hydroxyquinoline-7-sulphonic acid | greenish blue |
| 11 | 4-methoxy-2-aminophenol → 2-hydroxynaphthalene | 8-hydroxyquinoline-7-sulphonic acid | greyish blue |
| 12 | 4-chloro-2-aminophenol-5-N—methylsulphamide → 2-hydroxynaphthalene | 5-chloro-8-hydroxyquinoline-7-sulphonic acid | grey |
| 13 | 5-nitro-2-aminophenol → 5,8-dichloro-1-hydroxy naphthalene | 8-hydroxyquinoline-7-sulphonic acid | greenish blue |
| 14 | 4-chloro-2-aminophenol → 5,8-dichloro-1-hydroxy-naphthalene | 8-hydroxyquinoline-7-sulphonic acid | dark blue |
| 15 | 2-aminophenol-5-sulphonamide → 5,8-dichloro-1-hydroxy naphthalene | 5-chloro-8-hydroxy quinoline-7-sulphonic acid | bluish grey |
| 16 | 4-methoxy-2-aminophenol → 5,8-dichloro-1-hydroxy-naphthalene | 8-hydroxyquinoline-7-sulphonic acid | grey |
| 17 | 5-nitro-2-aminophenol-4-methylsulphone → 2-aminonaphthalene | 8-hydroxyquinoline-7-sulphonic acid | bluish green |
| 18 | 5-nitro-2-aminophenol → 2-aminonaphthalene-6-sulphonic acid-N—methylamide | 8-hydroxyquinoline-7-sulphonic acid | green |
| 19 | 5-nitro-2-aminophenol → 1-acetylamino-7-hydroxy-naphthalene | 8-hydroxyquinoline-7-sulphonic acid | dark green |
| 20 | 4-chloro-2-aminophenol → 1-acetylamino-7-hydroxy-naphthalene | 8-hydroxyquinoline-7-sulphonic acid | greenish grey |
| 21 | 5-nitro-2-aminophenol → | 8-hydroxyquinoline- | yellowish |

-continued

| | I | II | III |
|---|---|---|---|
| | 2-amino-6-methoxynaphthalene | 7-sulphonic acid | green |
| 22 | 4-chloro-2-aminophenol-5-N—methylsulphonamide → 2-aminonaphthalene | 5-chloro-8-hydroxy quinoline-7-sulphonic acid | dark green |
| 23 | 5-nitro-2-aminophenol → 2-aminonaphthalene | 5-chloro-8-hydroxy quinoline-7-sulphonic acid | green |
| 24 | 4-nitro-2-aminophenol → 4-tert. amylphenol | 8-hydroxyquinoline-7-sulphonic acid | brown |
| 25 | 2-aminophenol-4-sulphonic acid N—methoxyethylamide → 2-hydroxynaphthalene | 5-chloro-8-hydroxy quinoline-7-sulphonic acid | greyish violet |
| 26 | 2-aminobenzolene-1-carboxylic acid → 2-hydroxy-naphthalene | 8-hydroxyquinoline-7-sulphonic acid | brownish violet |
| 27 | 2-aminophenol-5-N—methyl-sulphonamide → 3-cyan-4-methyl-6-hydroxy-2-pyridone | 5-chloro-8-hydroxy-quinoline-7-sulphonic acid | red |
| 28 | 4,6-dichloro-2-amino-phenol → 1-hydroxy-naphthalene-3-sulphonamide | 8-hydroxyquinoline-7-sulphonic acid | blue |
| 29 | azomethine dye from 4-nitro-2-aminophenol and salicylaldehyde | 5-chloro-8-hydroxy-quinoline-7-sulphonic acid | brownish yellow |
| 30 | 5-nitro-2-aminophenol → 2-N—methylaminonaphthalene | 8-hydroxyquinoline-7-sulphonic acid | green |
| 31 | 5-nitro-2-aminophenol → 2-N—phenylaminonaphthalene | 8-hydroxyquinoline-7-sulphonic acid | green |
| 32 | 6-nitro-4-methyl-2-amino-phenol → 2-amino-naphthalene | 5-chloro-8-hydroxy-quinoline-7-sulphonic acid | dark green |
| 33 | 5-nitro-4-methyl-2-amino-phenol → 2-amino-naphthalene | 8-hydroxyquinoline-7-sulphonic acid | green |

We claim:

1. A chromium complex dye of the formula

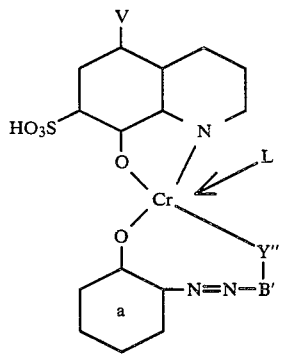

wherein
B' is

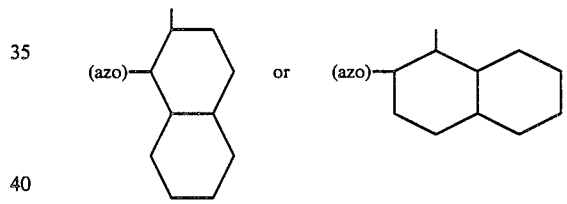

L is $H_2O$, ammonia, ethanol or ethanolamine;
V is hydrogen or chloro;
Y" is —O—, —NH— or —N(lower alkyl)—; and the phenyl ring a is substituted by one or two of nitro, chloro, methyl, methoxy, sulfonamido, N-methylsulfonamido or methylsulfonyl.

2. Chromium complex dyes according to claim 1 of the formula

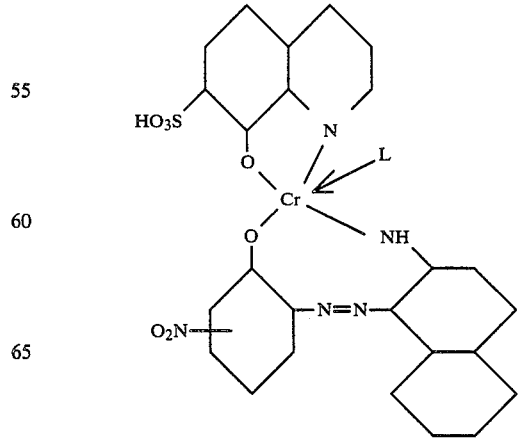

wherein L is $H_2O$ or $NH_3$.

* * * * *